(12) United States Patent
McCann

(10) Patent No.: US 6,993,038 B2
(45) Date of Patent: Jan. 31, 2006

(54) METHODS AND SYSTEMS FOR AUTOMATICALLY PROVISIONING ADDRESS TRANSLATION INFORMATION IN A MOBILE SERVICES NODE ADDRESS TRANSLATION DATABASE

(75) Inventor: Thomas Matthew McCann, Morrisville, NC (US)

(73) Assignee: Tekelec, Calabasas CA ( * ) Notice: Subject to any disclaimer, the term of this patent is extended or adjusted under 35 U.S.C. 154(b) by 771 days.

(21) Appl. No.: 10/166,968

(22) Filed: Jun. 11, 2002

(65) Prior Publication Data
US 2003/0227899 A1 Dec. 11, 2003

(51) Int. Cl.
*H04L 12/28* (2006.01)
(52) U.S. Cl. .................................... 370/401; 455/433
(58) Field of Classification Search ................ None
See application file for complete search history.

(56) References Cited

U.S. PATENT DOCUMENTS

| | | | |
|---|---|---|---|
| 5,854,982 A | | 12/1998 | Chambers et al. |
| 6,038,456 A | | 3/2000 | Colby et al. |
| 6,411,632 B2 | | 6/2002 | Lindgren et al. |
| 6,515,997 B1 | * | 2/2003 | Feltner et al. ............... 370/401 |
| 6,574,481 B1 | | 6/2003 | Rathnasabapathy et al. |
| 6,594,258 B1 | | 7/2003 | Larson et al. |
| 6,643,511 B1 | * | 11/2003 | Rune et al. .................. 455/433 |
| 6,684,073 B1 | * | 1/2004 | Joss et al. ................... 455/433 |
| 2001/0029182 A1 | * | 10/2001 | McCann et al. ............ 455/433 |
| 2004/0202187 A1 | * | 10/2004 | Kelly et al. ................. 370/401 |

* cited by examiner

*Primary Examiner*—Duc Ho
(74) *Attorney, Agent, or Firm*—Jenkins, Wilson & Taylor, P.A.

(57) ABSTRACT

An auto-provisioning routing node including a mobile services node network address translation database and an auto-provisioning function for automatically provisioning the database is disclosed. The auto-provisioning routing node receives signaling messages that require network address translation services. The auto-provisioning routing node routes messages for which no translations exist to a default mobile services node and adds entries for the corresponding IMSIs in its mobile services node network address translation database. The default mobile services node determines whether it has records for these messages. If the default mobile services node does not have records for these messages, the default mobile services node routes the messages to a second mobile services node via the routing node. The routing node updates entries for IMSIs in the mobile services node network address translation database based on the information inserted by the default mobile services node. This process may continue by mobile services nodes routing to subsequent nodes, with the routing node continuing to update its database, until the mobile services node containing the IMSI is found.

29 Claims, 6 Drawing Sheets

METHODS AND SYSTEMS FOR AUTOMATICALLY PROVISIONING ADDRESS TRANSLATION INFORMATION IN A MOBILE SERVICES NODE ADDRESS TRANSLATION DATABASE

TECHNICAL FIELD

The present invention relates to provisioning signaling message address translation information in a database. More particularly, the present invention relates to methods and systems for automatically provisioning address translation information in a mobile services node address translation database.

BACKGROUND ART

In mobile communications networks, a home location register is a database that stores permanent subscriber information. The HLR is an integral component of CDMA, TDMA, and GSM networks. The HLR is maintained by the subscriber's home carrier and stores pertinent user information, including address, account status, location, and preferences. The HLR interacts with a mobile switching center (MSC), which is a switch used to setup and tear down calls to and from mobile subscribers.

HLRs store the above-described information for each subscriber in a particular carrier's network. In other words, an HLR database may include an individual database record for each subscriber. Since many mobile carriers or service providers have millions of subscribers, HLR databases have become large. When an HLR database is located on a single computer in a particular carrier's network, signaling traffic to and from the HLR and processing load on the HLR becomes a bottleneck.

One conventional method for reducing the signaling traffic and processing load on HLRs is to distribute HLR databases among multiple physical HLR nodes. In such a distributed database environment, each of a carrier's HLRs may include a predetermined subset of the subscriber records of a particular mobile carrier. If the subscriber records are distributed equally among the multiple HLRs, the processing load on the HLRs can be reduced by a factor of n, where n is the number of HLRs. However, in order to distribute subscriber records among multiple HLRs, signaling message routing intelligence must be built into the network so that other network nodes will be able to locate a particular subscriber record. In particular, mobile subscriber identification information must be derived from a signaling message and translated into an HLR address. In GSM networks, mobile subscriber ISDN (MSISDN) and international mobile subscriber identity (IMSI) numbers can be used to identify mobile subscribers. In IS-41 networks, mobile directory numbers and mobile identification numbers can be used to identify mobile subscribers. These numbers can be translated into the point code in SS7 networks or IP address in IP networks of the HLR that contains a particular subscriber's information.

In conventional mobile communications networks, the HLR address translations were performed by mobile switching centers. Each mobile switching center included a database that assigned a range of subscriber numbers to a particular HLR. One problem with this conventional range-based routing is that it limited mobile service providers' flexibility in assigning subscriber numbers to HLRs. The mobile service provider was required to assign a range of subscriber numbers to each HLR. Requiring each HLR to be assigned a range of subscriber numbers limited the service providers' ability to efficiently load share between multiple HLRs. In addition, the subscriber was prevented from porting numbers into an HLR when the numbers were not within the particular range of numbers assigned to that HLR. Similarly, when a subscriber number is ported out of an HLR, messages for the particular subscriber would continue to be routed to that HLR even though the subscriber's record was no longer there.

In order to avoid these difficulties associated with conventional range-based HLR routing, flexible numbering systems have been developed. One such flexible numbering product is G-FLEX, available from Tekelec of Calabasas, Calif. According to the G-FLEX product, tables in a signal transfer point are used to map individual subscriber IMSI and MSISDN numbers to HLR addresses. Another product, referred to as application location register or ALR available from Alcatel includes two databases in a signal transfer point that map subscriber numbers to HLR addresses. Yet another product that includes a database that allows service providers to flexibly assign subscriber numbers to HLRs is the virtual home location register or the flexible numbering register available from Ericsson.

The subscriber-number-to-HLR address translation databases can become large due to the number of subscribers in a particular service provider's network. In some instances, these databases can include millions of records. Due to the large size of these databases, provisioning the translation in the databases can be both time and labor intensive. Conventionally, these translation databases have been provisioned manually. That is, a technician or other individual is required to manually enter the translation data for each translation into the database. This manual provisioning process is time and labor intensive and increases the likelihood of erroneous translation data being entered.

One automatic provisioning solution has been proposed in which a signal transfer point learns mobile subscriber ISDN (MSISDN) numbers based on received signaling messages. However, not all mobile signaling messages routed to HLRs include MSISDN numbers. Moreover, this conventional method assumes that IMSI-to-HLR address translations have been provisioned manually. This reliance on manual provisioning of IMSI numbers includes the same problems of increased time, labor, and likelihood of error. Moreover, if the IMSI-to-HLR address translations are not provisioned in advance, this conventional solution does not work. For example, this conventional solution discusses leaning MSISDN-to-HLR mappings using InsertSubscriberData MSISDN parameters and CgPA E.164 addresses for messages received on HLR links. InsertSubscriberData messages are sent from an HLR to a VLR in response to location updating by the VLR. In order for the VLR to perform a location updating transaction, the VLR must be able to send an UpdateLocation message to the correct HLR. Since UpdateLocation messages have IMSIs and not MSISDN parameters, one conventional method for sending the UpdateLocation message to the correct HLR is for the VLR to place the mobile subscriber's IMSI in the CdPA field of the UpdateLocation message. An intermediate STP would then global-title-translate the UpdateLocation message and route the message to the correct HLR. If the global title translation data for mapping the IMSI to the correct HLR is not pre-provisioned in the STP, the subsequent InsertSubscriberData transaction cannot occur. As a result, the MSISDN-to-HLR address translation cannot be learned either.

Accordingly, in light of these difficulties associated with conventional provisioning systems, there exists a long-felt need for improved methods and systems for provisioning translation information in a mobile services node address translation database.

DISCLOSURE OF THE INVENTION

According to one aspect, the present invention includes an auto-provisioning routing node that automatically associates or learns the mobile services node serving a particular mobile subscriber or mobile station. The auto-provisioning routing node receives and processes signaling messages addressed or destined to a mobile services node, such as an HLR. An automatic provisioning function (APF) within the auto-provisioning routing node extracts an IMSI value from a received signaling message and creates an entry in an IMSI mapping database if an entry does not already exist. In such a case, a default HLR identifier is associated with the newly inserted IMSI in the IMSI mapping database, and the message is routed to the default HLR. The default HLR receives the message and determines whether it has a record corresponding to the IMSI. If the default HLR does not contain the IMSI, the default HLR modifies routing information in the message, and addresses the message to a second HLR. The modified message is subsequently routed to the second HLR via the auto-provisioning routing node. As the modified message is being routed through the auto-provisioning routing node, the APF updates the IMSI entry to indicate an association with the second HLR. This process is repeated until the correct HLR is located. Thus, while the invention will be explained in terms of routing the message successively to first and second HLRs, the methods and systems described herein are applicable to successively routing the message to any number of HLRs. The HLR prior to the correct HLR will route the message through the auto-provisioning routing node, and the mobile services node address translation database will automatically be updated with the entity address for the correct HLR.

Such automatic provisioning of IMSI to HLR associations in the network routing node can result in significant savings for the owner of the routing node. This is due to the lack of need for a system to send the IMSI-to-HLR mappings to the routing node and the associated communication infrastructure and support personnel.

Accordingly, it is an object of the present invention to provide a message routing node that is capable of automatically provisioning or learning IMSI-based address translation rules.

It is another object of the present invention to provide a self-learning routing system for routing signaling messages in a multiple HLR network environment based on IMSI information contained in the messages.

Some of the objects of the invention having been stated hereinabove, other objects will become evident as the description proceeds, when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
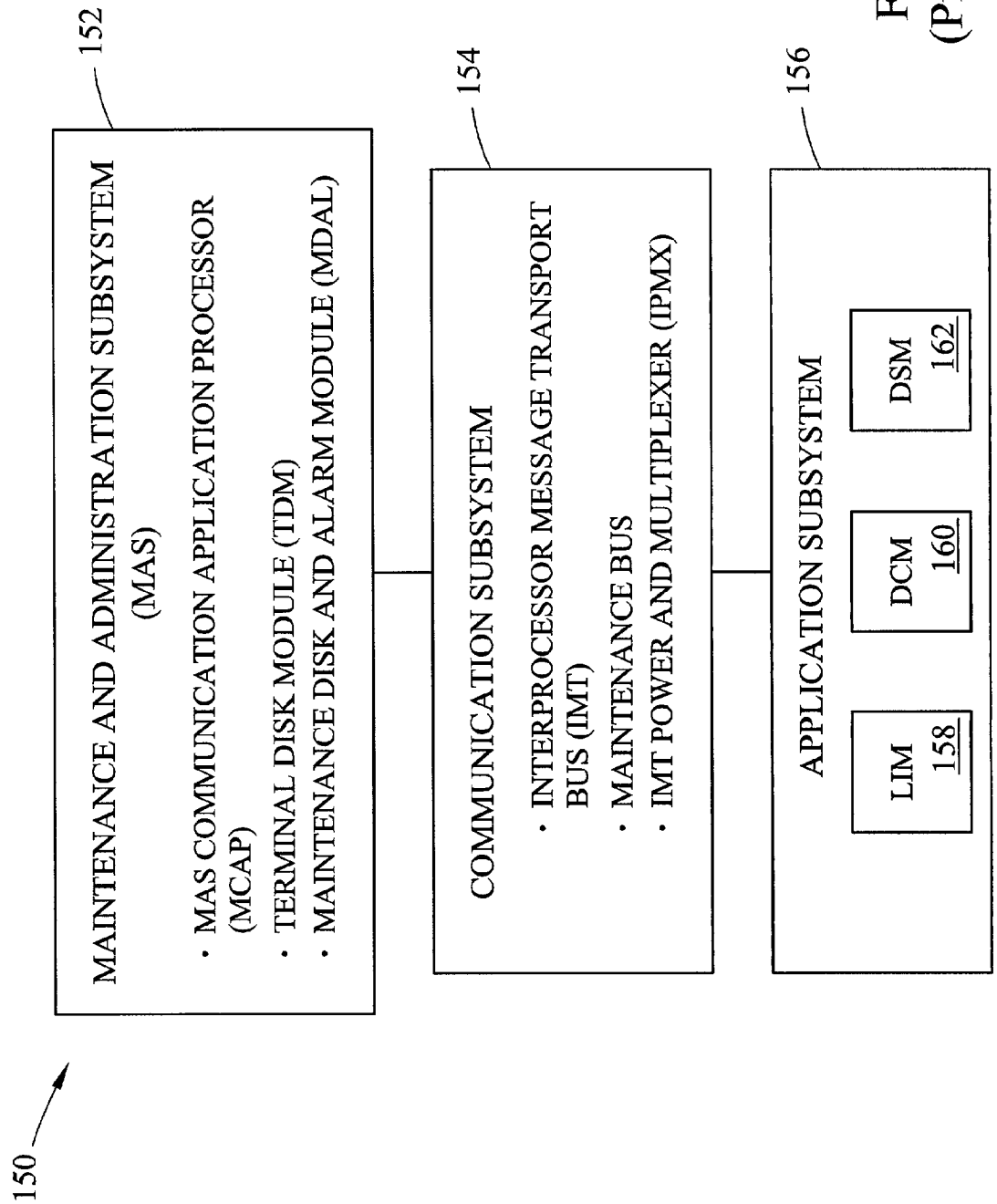
FIG. 1 is a block diagram of a signal transfer point routing node architecture suitable for use with embodiments of the present invention.

According to one embodiment, the present invention includes an auto-provisioning routing node for communicating with multiple mobile services nodes, such as HLRs, SMSCs, or voice mail servers. An auto-provisioning (AP) routing node of the present invention may employ an internal architecture similar to that of a high performance signal transfer point (STP) and signaling gateway products that are marketed by the assignee of the present application as the EAGLE® STP and IP$^7$ Secure Gateway™, respectively. A block diagram of an exemplary IP$^7$ Secure Gateway™ routing node architecture is shown in FIG. 1. Sample IP$^7$ Secure Gateway™ routing node 150 includes the following subsystems: a maintenance and administration subsystem (MAS) 152, a communication subsystem 154 and an application subsystem 156. MAS 152 provides maintenance communications, initial program load, peripheral services, alarm processing and system disks. Communication subsystem 154 includes a pair of dual-ring, counter rotating buses that carry messages between processor cards within routing node 150. These buses are collectively referred to as the interprocessor message transport (IMT) bus.

Application subsystem 156 includes application cards that are capable of communicating with the other cards through the IMT bus. Numerous types of application cards can be incorporated into routing node 150, including: a link interface module (LIM) 158 that interfaces with SS7 links and X.25 links, a data communications module (DCM) 160 that provides an Internet Protocol interface using transport adapter layer interface over transmission control protocol or other suitable application/transport layer protocols (H.323, SIP, SUA/M2UA/M3UA/SCTP, etc.), and a database service module (DSM) 162 that may provide global title translation, gateway screening, and other database-related services.

Auto-Provisioning Routing Node Architecture

Figure 2:
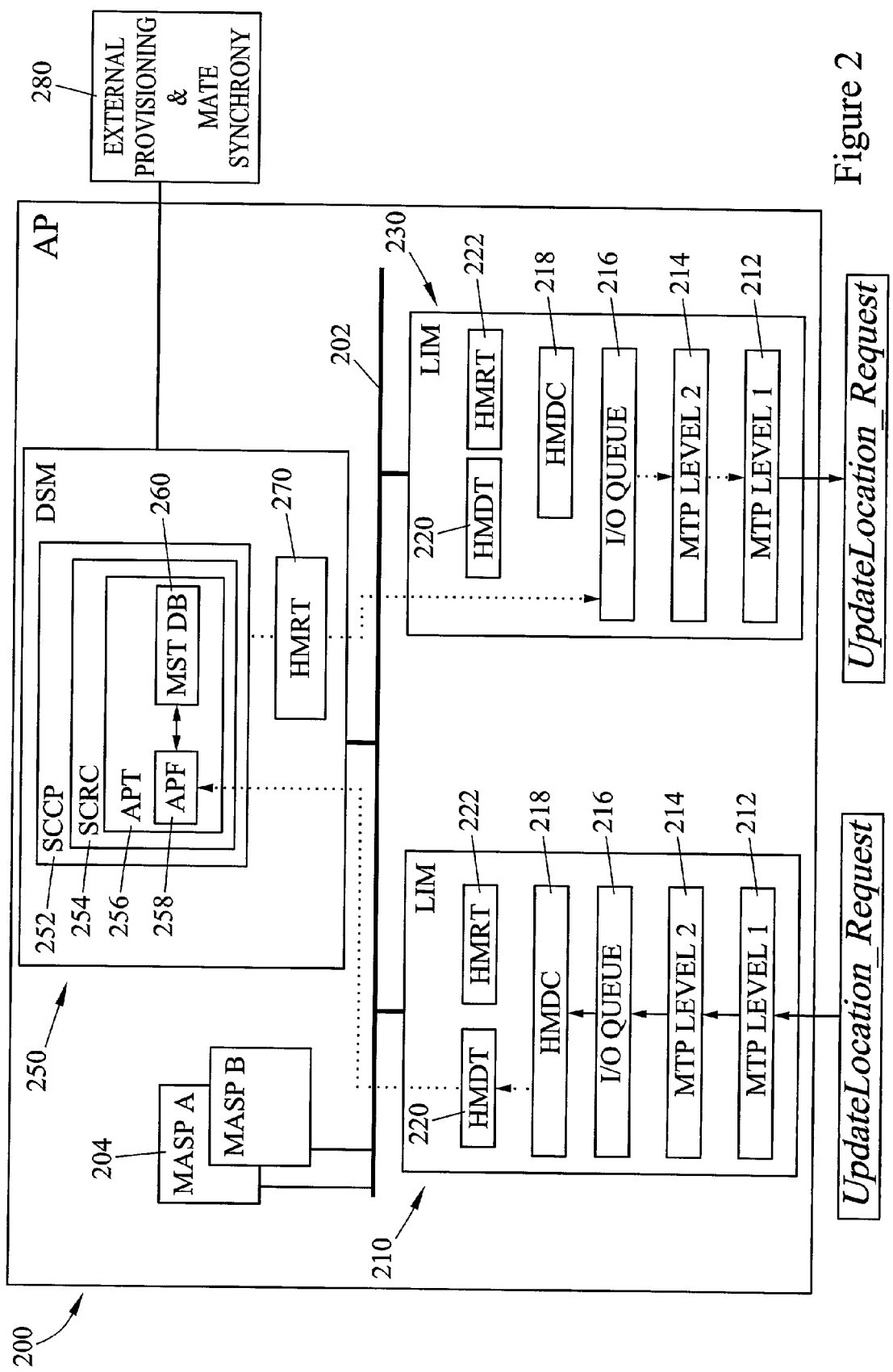
FIG. 2 is a block diagram of an auto-provisioning routing node according to an embodiment of the present invention illustrating internal message flow associated with a MAP UpdateLocation_Request signaling message.

Presented in FIG. 2 is an exemplary embodiment of an auto-provisioning routing node, generally indicated by the numeral 200. AP routing node 200 includes a high-speed interprocessor message transport (IMT) communications bus 202 and a plurality of processor cards connected to IMT bus 202. In the illustrated example, the cards connected to IMT bus 202 include a pair of maintenance and administration subsystem processors (MASPs) 204, a pair of SS7 link interface modules 210 and 230, and a database service module 250. For simplicity of illustration, only a single DSM is included in FIG. 2. However, it should be appreciated that the distributed, multi-processor architecture of the node 200 facilitates the deployment of multiple LIM, DSM, DCM and other processing and communication cards, which may be simultaneously connected to IMT bus 202.

LIMs 210 and 230 each have a number of hardware or software-implemented processes that send and receive signaling messages over SS7 signaling links. In the illustrated example, these processes include an SS7 MTP level 1 protocol process 212, an MTP level 2 process 214, an I/O buffer or queue 216, an SS7 MTP level 3 layer HMDC message discrimination process 218, an HMDT message distribution process 220, and an HMRT message routing process 222. MTP level 1 and 2 processes 212 and 214, respectively, send and receive digital data over a particular physical interface, as well as to provide error detection, error correction, and sequenced delivery of SS7 message packets. I/O queue 216 buffers incoming and outgoing signaling message packets. MTP level 3 HMDC message discrimination process 218 determines whether an incoming SS7 message packet should be discarded, requires processing by an internal/associated subsystem, or is simply to be through switched, i.e., routed to another node. HMDT process 220 handles the internal distribution of message packets that require additional processing by an internal associated subsystem. HMRT process 222 routes message to the appropriate outbound signaling link.

A DSM module of the present invention provides the databases and database control functions necessary to perform network address translation processing on received signaling message packets, as well as to automatically provision and/or update individual mobile subscriber/station routing rules during the course of normal message routing operations.

In FIG. 2, DSM 250 includes a signaling connection control part (SCCP) function 252 for performing SCCP-related functions. One component of SCCP function 252 is signaling connection routing controller (SCRC) process 254. SCRC process 254 is responsible for discriminating message packets received at DSM 250 and, when appropriate, directing incoming message packets to an auto-provisioning translation application or subsystem 256. Parameters used to perform such discrimination processing by SCRC controller 254 may include an SCCP subsystem (SSN) parameter, an SCCP nature of address indicator (NAI), an SCCP numbering plan (NP) parameter, an SCCP translation type (TT) parameter, an SCCP global title indicator (GTI), and a network or protocol domain. Any combination of one or more of the above mentioned parameter values may be provisioned by a network operator to identify messages that are potential candidates for AP processing. For example, a signaling message received by DSM card 250 that includes a GTI value of 4, a TT value of 0, an NP value of 1, an NAI value of 4, a SSN value of 6, and is of the ITU domain may be directed to APT application 256 for further processing.

In one embodiment, APT application 256 includes an auto-provisioning function 258 and a mobile services translation database 260. APF 258 receives a signaling message packet from SCRC process 254 and examines the message to determine whether auto-provisioning processing is indicated. APF may decode and examine a number of parameters in order to determine whether AP processing is required. These parameters may include a mobile application part (MAP) operation code (opcode) or message type indicator, and a mobile subscriber or station identifier (e.g., an IMSI). In some cases, the mobile subscriber or station identifier may be decoded and extracted from the SCCP layer of a message. In other instances, the mobile station identifier may be extracted from the MAP layer. APF 258 may examine a mobile subscriber or station identifier extracted from a message, such as an IMSI, to determine whether or not the IMSI is associated with a mobile station in the home network AP routing node 200. If the IMSI does not belong to the home network, then no auto-provisioning processing is performed. As such, messages associated with roaming or visiting mobile subscribers do not trigger auto-provisioning operation, and valuable data storage resources are not wasted.

A MAP message type discrimination table may be employed to identify mobile service messages that trigger AP processing. Table 1 shown below illustrates exemplary message types that may trigger AP processing. In the illustrated example, Table 1 includes a MAP opcode field and a message name field. The opcode field may be compared to opcode values in received messages for AP discrimination purposes. The message name field is included in Table 1 for illustrative purposes.

TABLE 1

| MAP Message Type Discrimination Table | |
|---|---|
| MAP opcode | Message Name |
| 02H | UpdateLocation |
| 03H | CancelLocation |
| 04H | ProvideRoamingNumber |
| 07H | InsertSubscriberData |
| 08H | DeleteSubscriberData |
| 16H | SendRoutingInfo |
| 2DH | SendRoutingInfoForSM |

A subsystem discrimination table may be employed to identify the types of mobile service nodes which may receive signaling messages that require MSN address translation processing, and possibly AP processing. Table 2 shown below illustrates exemplary SSN values that may be used for SSN discrimination. In the illustrated example, an SSN value of 6 indicates that a message is destined or an HLR and an SSN of 8 indicates that a message is destined for a short message service center. Accordingly, incoming message with either of the SSN values may be selected for further AP processing.

TABLE 2

| SSN Discrimination Table | |
|---|---|
| SSN | MSN Entity |
| 6 | HLR |
| 8 | MSC |

MST database 260 includes address translation rules for signaling messages that are destined to certain mobile service nodes (e.g., HLRs). In one embodiment, routing address translation information is stored in a data structure such as a binary tree (B-tree) structure. A B-tree selector table, similar to that illustrated in Table 3, is employed to facilitate selection of an appropriate B-tree handle with which translation data may be efficiently searched. In the example shown in Table 3, several parameters are used to select a B-tree handle, including a network or protocol domain parameter, a GTI parameter, a TT parameter, a NP parameter, and a NAI parameter. As such, these parameters may be extracted from a received signaling message and used to perform B-tree handle selection.

TABLE 3

B-Tree Selector Table

| Domain | GTI | TT | NP | NAI | SNP | SNAI | B-Tree Handle | Default EA |
|--------|-----|----|----|-----|-----|------|---------------|------------|
| ANSI | 2 | 1 | 3 | 1 | E.164 | INTL | MSISDN | 919200-1111 |
| ITU | 4 | 0 | 1 | 4 | E.212 | NATL | IMSI | 919200-1111 |

Table 3 also includes a stored numbering plan (SNP) field and a stored nature of address indicator (SNAI) field, which contain information that may be used to condition global title address (e.g., IMSI, MSISDN) information prior to executing a B-tree search. Each B-tree handle entry also includes a default routing instruction, which may be used if a search of the B-tree data does not yield a match. The default routing instruction shown in Table 3 is an entity address. An entity address is an alias address that is assigned to a network element, such as an HLR. The entity address may be in any suitable format, such as E.212 or E.164 format. In an alternate example, the default routing instruction may be an SS7 network address, an Internet protocol address, or other network routing address.

MST database 260 may also include a B-tree handle table for obtaining a start node for performing an address translation. Table 4 shown below illustrates an example of a B-tree handle table that may be used. The B-tree handle table maps each of the B-tree handles identified in Table 3 with their corresponding starting nodes in the B-tree data structure. For example, in Table 4, the start node for the IMSI B-tree is 1, and the start node for the MSISDN B-tree is 342.

TABLE 4

B-Tree Handle Table

| B-Tree Handle | Start Node |
|---------------|------------|
| MSISDN | 342 |
| IMSI | 1 |

Each node in the IMSI or MSISDN B-tree is associated with one or more mobile subscriber or mobile station identifiers, which are referred to in this context as global title addresses (GTAs). Table 5 illustrates a sample set of nodal data. An entity address, a routing indicator (RI) value, a TT value, a NP value, and an NAI value is associated with each GTA. A secondary entity address to point code/SSN mapping or translation is performed using mapping data, such as that shown in Table 6. This data collectively constitutes routing address translation data, as an entity address/DPC-SSN value is sufficient to identify a target mobile services node to which the translated message should be routed for service. However, in some cases, the DPC/SSN specified (along with an RI value of "Route-On-GT") may identify a node in the network where another routing address translation may be performed.

TABLE 5

B-Tree Nodal Data

| Node | GTA | Entity Address | RI | TT | NP | NAI |
|------|-----|---------------|--------|----|----|-----|
| 456 | 9192604343 | 9192001111 | PC/SSN | 1 | 1 | 1 |
| 16576 | 9193451022 | 9192001112 | PC/SSN | 1 | 1 | 1 |

TABLE 6

Entity Address Mapping Data

| Entity Address | DPC | SSN |
|----------------|-----|-----|
| 9192001111 | 1-1-1 | 6 |
| 9192001112 | 1-1-2 | 6 |

A mobile subscriber or mobile station identifier may be decoded and extracted from a received signaling message and subsequently used to search a particular B-tree for a matching B-tree node or GTA. If a matching GTA is located, the entity data is extracted from the B-tree data and incorporated in the routing label of the signaling message. If no matching GTA is located, default entity data is incorporated in the routing label of the signaling message.

With regard to signaling messages that are identified as AP processing triggers, APF 258 may update routing data in MST database 260. Such updating may involve the insertion of a new B-tree node or GTA entry or may involve the modification of routing data associated with an existing B-tree node or GTA entry. A more detailed discussion of MST database updating conditions and procedures will be described below.

Once a message has been modified to include the appropriate entity data, HMRT routing process 270 routes the message to its intended destination. More particularly, HMRT process 270 determines to which LIM or DCM card a message should be routed for outbound transmission.

In FIG. 2, DSM 250 is coupled to an external provisioning system 280 via a communication link, such as an Ethernet connection. External provisioning system 280 is responsible for administration and maintenance of data associated with the APT application, including some or all of the data described above and generally illustrated in Tables 1 through 6. Provisioning system 280 may also retrieve the above mentioned APT application data from AP node 200 and use this data to update a mated AP node (and vice versa), and synchronize APT data on mated nodes.

Auto-Provisioning MSN Routing System Operation

Figure 3:
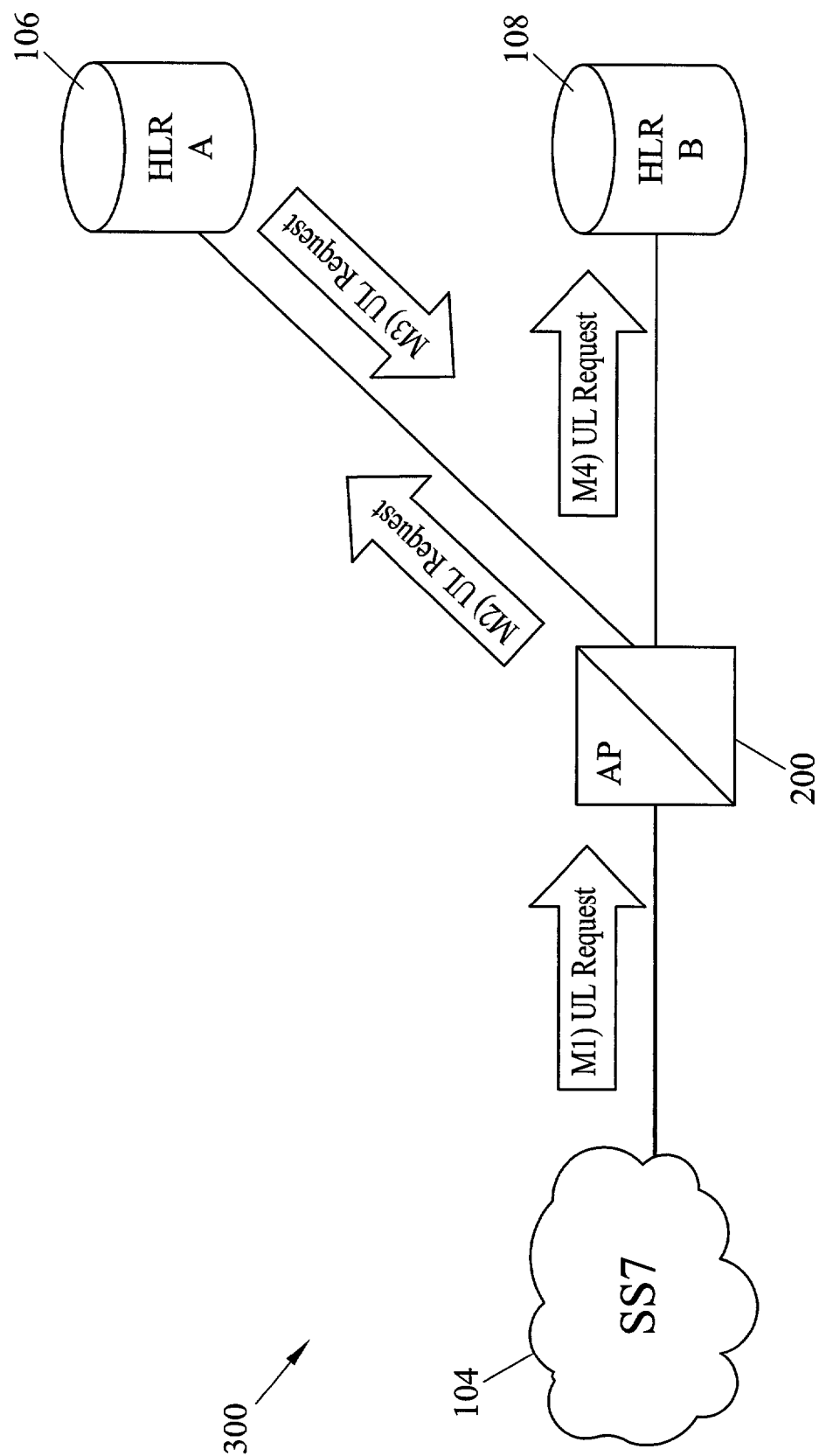
FIG. 3 is a network diagram illustrating a multiple mobile services node network environment and the routing of a MAP UpdateLocation_Request signaling message by an auto-provisioning routing node according to an embodiment of the present invention.

FIG. 3 is a network diagram illustrating exemplary operation of an auto-provisioning routing system according to an embodiment of the present invention. In FIG. 3, network 300 includes an SS7 signaling network 104, a first HLR 106, a second HLR 108, and an AP routing node 200. An exemplary transmission pathway or flow of a MAP UpdateLocation_Request signaling message through network 300 is also illustrated.

Figure 4:
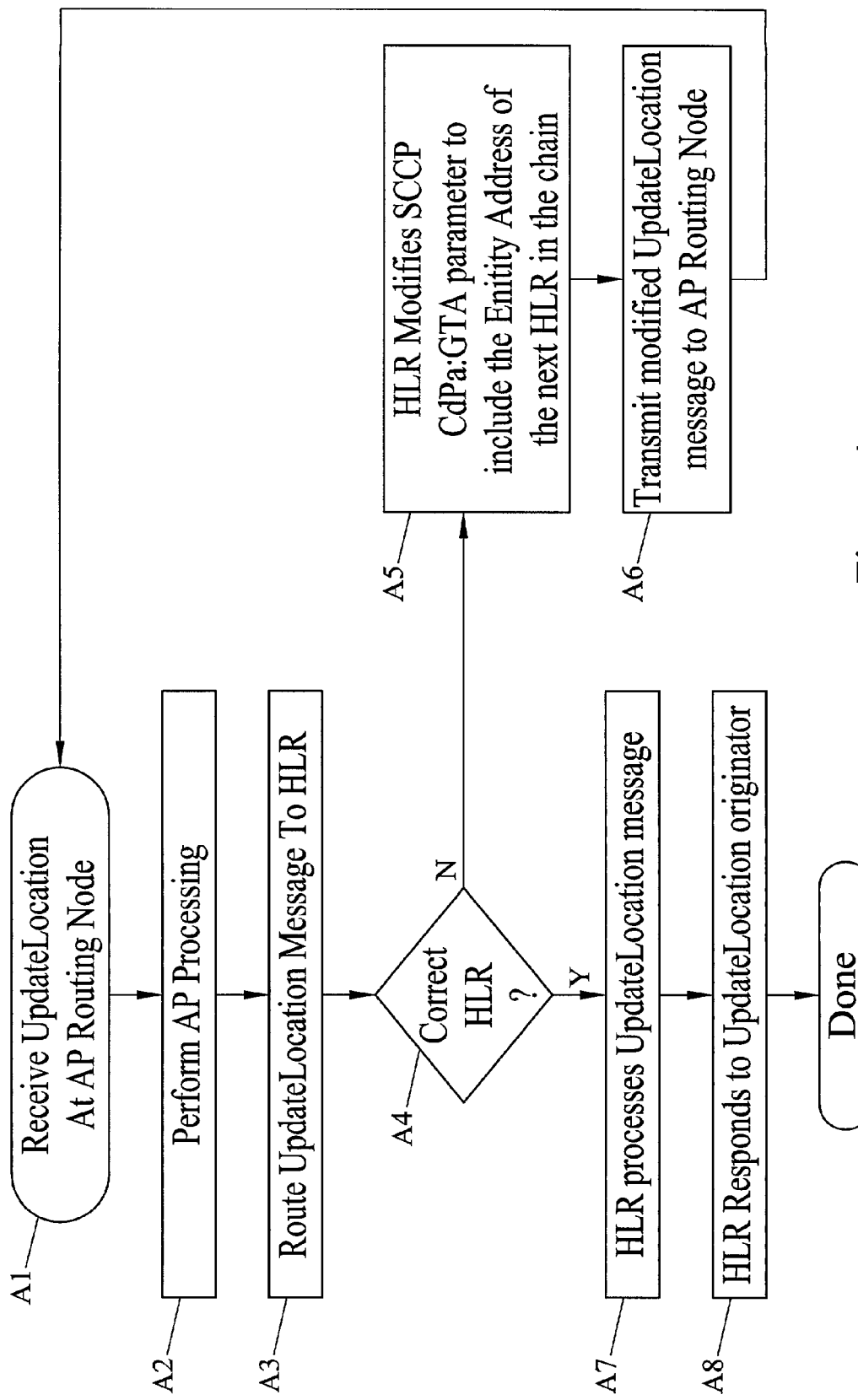
FIG. 4 is a message processing flow chart diagram associated with an auto-provisioning MSN routing system according to an embodiment of the present invention.

FIG. 4 provides a system level message processing diagram that may be used in conjunction with FIG. 3 to better understand the operation of an AP routing system of the present invention. Exemplary operation of the overall AP routing system will be described first. Next, AP routing node operation will be described in further detail. Beginning with FIG. 4, an UpdateLocation_Request message (M1) is received by AP routing node 200 from SS7 signaling network 104. In a GSM network, a MAP UpdateLocation transaction is typically initiated by a visitor location register in order to update mobile subscriber or mobile station location information stored in an HLR. An UpdateLocation transaction requires a number of information elements or parameters in order to function successfully, including an IMSI identifier.

Table 7 shown below illustrates mandatory, optional, and conditional parameters that may be included in MAP UpdateLocation signaling messages as defined in ETSI TS 100 974 V7.6.0 (2000-09) Digital Cellular Telecommunications System (Phase 2+); Mobile Application Part (MAP) Specification (3GPP TS 09.02 version 7.6.0 Release 1998), the disclosure of which is incorporated herein by reference in its entirety. In Table 7, the letter "M" indicates that a parameter is mandatory. The symbol "=" indicates that a parameter takes the value of a parameter immediately to its left in the table. The symbol "U" indicates that the parameter is the choice of the service user. The letter "C" indicates that the inclusion of the particular parameter is conditional. As illustrated in Table 7, the IMSI number is a mandatory parameter in MAP UpdateLocation request and indication primitives. The MSISDN number is not a mandatory parameter in any of the MAP UpdateLocation primitives. The MAP UpdateLocation request and response primitives have corresponding UpdateLocation_Request and UpdateLocation_Response messages that are set over the network.

TABLE 7

MAP UpdateLocation Message Structure

| Parameter | Request | Indication | Response | Confirm |
|---|---|---|---|---|
| Invoke ID | M | M(=) | M(=) | M(=) |
| IMSI | M | M(=) | | |
| MSC Address | M | M(=) | | |
| VLR Number | M | M(=) | | |
| LMSI | U | C | | |
| HLR Number | | | C | C(=) |
| User Error | | | C | C(=) |
| Provider Error | | | | O |

MAP protocol messages, such as UpdateLocation_Request messages, use the services of the SCCP protocol. Within an SS7 message signaling unit (MSU) that contains a MAP UpdateLocation_Request message, the SCCP called party address (CdPA) parameter is often used to store the IMSI identifier associated with the UpdateLocation transaction. The IMSI may thus be used to determine a mobile services node address for MAP UpdateLocation messages. A primary objective of an AP routing system of the present invention is to automatically provision IMSI-to-MSN translations within a routing node. A signaling message that contains an IMSI identifier is required to obtain a translation. Although the examples discussed herein relate primarily to MAP UpdateLocation messages, any suitable signaling message that contains an IMSI identifier may be used by an AP routing system of the present invention to automatically provision its database.

Referring to FIGS. 3 and 4, an UpdateLocation_Request message (M1) is received by AP routing node 200, as indicated in step A1. Auto-provisioning processing is performed on the received message (step A2), and the processed message (M2) is routed to HLR 106, as indicated in step A3. HLR 106 receives UpdateLocation_Request message M2 and examines the IMSI contained in the message (step A4). If HLR 106 determines that it has a record corresponding to the IMSI, the HLR processes the message normally (step A7) and may subsequently respond with an UpdateLocation_Response message (step A8). If HLR 106 determines that it does not have a record corresponding to the IMSI, HLR 106 modifies routing information in the message and transmits the modified message (M3) back to AP routing node 200 (steps A5 and A6). More particularly, HLR 106 modifies routing information in the message to include an entity address associated with the next HLR node that might contain the subscriber data associated with the IMSI. The message M3 is received by AP routing node 200 and processed by the AP subsystem within the node. The message (M4) is subsequently routed to the HLR entity address specified by HLR 106, which, in this example, is HLR 108. In a manner similar to that described above, HLR 108 receives the UpdateLocation_Request message M4 and examines the IMSI contained in the message. In this case, HLR 108 determines that it has a record corresponding to the IMSI, and the UpdateLocation_Request message is terminated (i.e., is not modified and returned to the AP routing node). HLR 108 updates the subscriber record to include the new location of the subscriber specified in the UpdateLocation_Request message.

In the example illustrated in FIG. 3, two HLR nodes operate in the AP routing system. An auto-provisioning routing system of the present invention may include any number of HLRs. In such a system, each HLR node is configured to modify routing information contained in messages associated with subscribers whose information is not stored in that HLR. The modified routing information causes the message to be forwarded to the next HLR that may contain the desired subscriber information. As such, a fixed routing sequence or chain of HLR nodes may be constructed such that an incorrectly routed message is sequentially passed from one HLR node in the chain to the next until the correct HLR node is encountered.

It is important to note that each time a message is passed from one HLR node to the next HLR node in the sequence, the message is routed via the AP routing node. As such, the AP routing node has an opportunity to observe and record the new routing address inserted by each "incorrect" HLR node. The record of the HLR addresses automatically provisions IMSI-to-HLR routing address translation data. Consequently, a single UpdateLocation_Request message may trigger several automatic routing address translation data updates. If the last HLR in the chain does not have a record corresponding to the IMSI in a received message, that HLR may return an unrouteable entity address, and the routing node may return an error message to the VLR. To reduce the likelihood of this situation occurring, a check may be performed in advance of auto-provisioning processing to determine whether the IMSI belongs to the mobile service provider who owns the routing node. If the IMSI does not belong to the particular service provider, auto-provisioning functionality may be bypassed, and the message may be global title routed to its GTT destination.

Auto-Provisioning Routing Node Operation

Figure 5A:
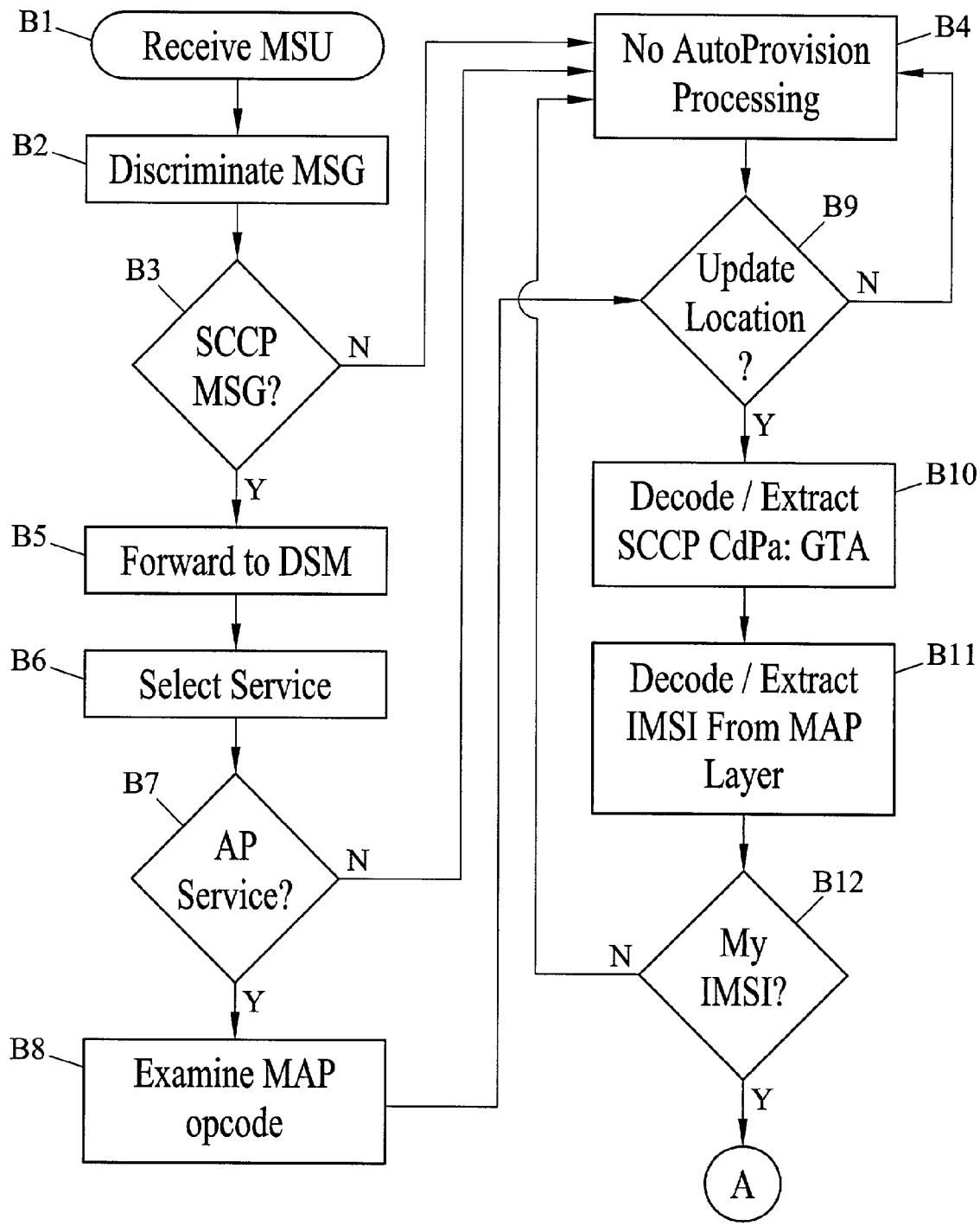
FIGS. 5A and 5B are a MAP UpdateLocation_Request message processing flow chart diagram associated with an auto-provisioning routing node according to an embodiment of the present invention.
Figure 5B:
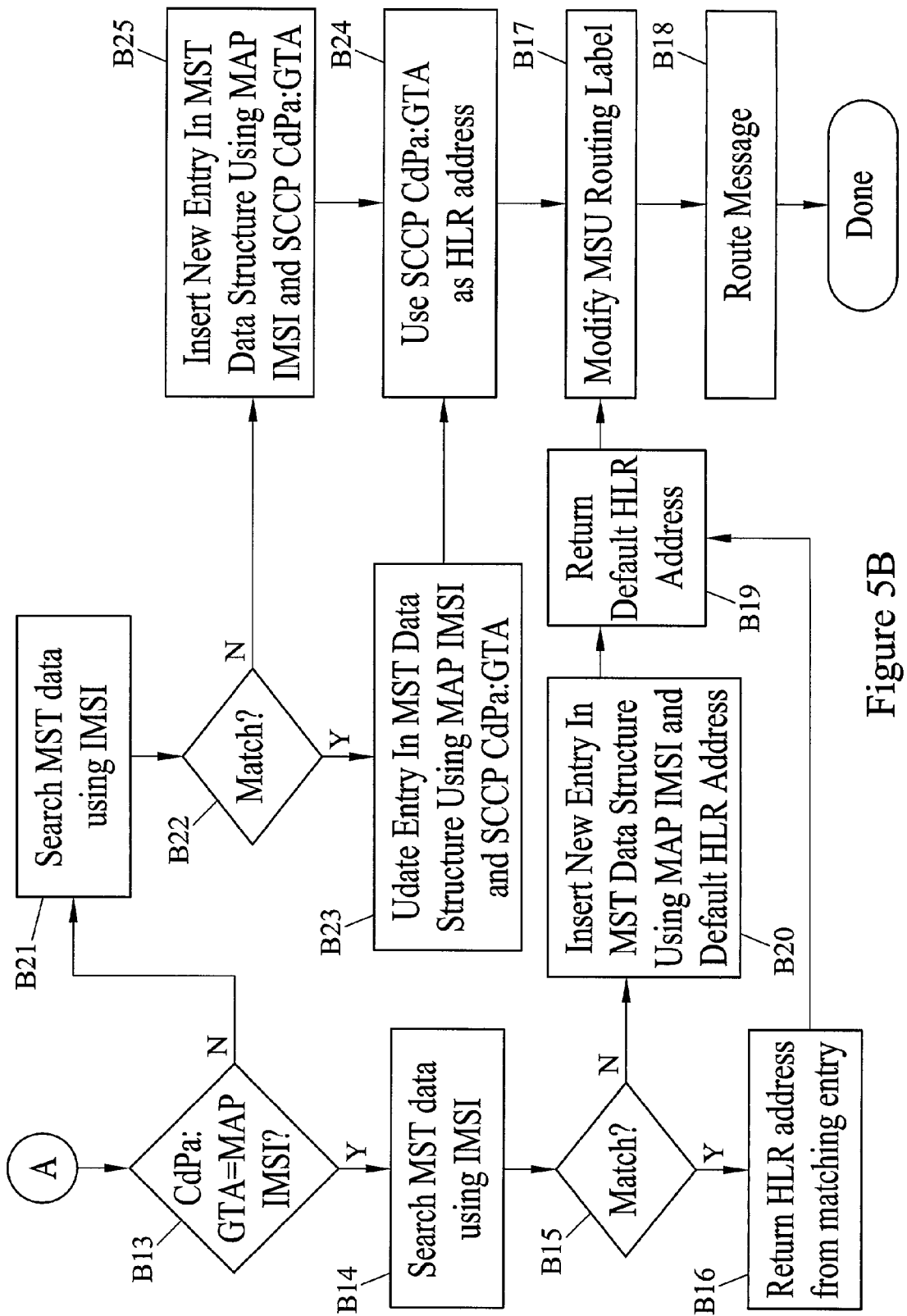

FIGS. 5A and 5B are a flow chart illustrating exemplary auto-provisioning processing associated with the AP routing node embodiment 200 shown in FIG. 2. As indicated in FIG. 5A, message M1 is received at the AP routing node by LIM 210 (step B1). MTP level 1 and 2 functions 212 and 214 process the incoming signaling message packet and pass the packet to I/O queue 216 where it may be temporarily buffered. HMDC message discrimination process 218 receives the message packet from buffer 216 and executes or applies a message discrimination algorithm (steps B2 and B3). In the present example, discrimination process 218 may decode and examine a number of parameters in the received UpdateLocation_Request message including an origination point code (OPC) parameter, a DPC parameter, a SSN parameter, a RI parameter, and a service indicator (SI)

parameter. In one embodiment, discrimination process 218 may receive an SS7 MSU containing an SCCP component (i.e., SI=3) that is addressed to a DPC/SSN associated with the AP routing node 200 and subsequently identify the message as requiring further processing by an AP node internal subsystem. If discrimination process 218 determines that further AP processing is not required, AP processing ends (step B4).

In the present example, the received MAP UpdateLocation_Request message M1 is identified by discrimination process 218 as requiring further routing address translation processing, and subsequently passed to HMDT message distribution process 220. Distribution process 220 directs the message packet to the AP module or subsystem 250 via IMT communication bus 202. (step B5)

The message packet is received by AP module 250 and processed by SCRC 252. SCRC 252 examines one or more SCCP parameters to determine the type of service required for the message (steps B6 and B7). If AP service is not required, AP processing ends (step B4). Otherwise AP processing continues. APF 256 decodes the MAP portion of the received message and examines a message type or opcode parameter (step B8). If the MAP message type is determined to be one that is suitable for initiating AP service (step B9), then further AP processing may be performed. An example of a MAP message type that is suitable for initiating AP service is a MAP UpdateLocation_Request message. If the MAP message type is determined to be one that is not suitable for initiating AP service, then no further AP processing is performed, as indicated in step B4. In such cases, routing address translation may be still be performed without invoking AP service.

In the present example, APF 256 determines that the received message M1 is an UpdateLocation_Request message and consequently decodes and extracts both a GTA parameter from the SCCP called party field of the message and an IMSI identifier from the MAP portion of the message (steps B10 and B11). A check is then performed to determine whether the IMSI associated with the message M1 corresponds to an IMSI that is known to be "owned" by the network that the AP routing node 200 is supporting (step B12). If the IMSI is not owned by the network that the AP routing node 200 is supporting, then no further AP processing is performed on the message (step B4). However, if the IMSI is owned by the network that the AP routing node 200 is supporting, then a check is performed to determine whether the IMSI extracted from the MAP portion of the message is the same as the GTA parameter value extracted from the SCCP portion of the message (step B13).

If the MAP IMSI and the SCCP GTA value are the same, this means that the message is a new MAP message originate by a VLR instead of from an HLR that did not contain a record for the message. In this case, a search of the IMSI B-tree data structure of database 260 is initiated using either the MAP or SCCP IMSI (step B14). If a matching entry is located in the IMSI B-tree data structure, then the routing address translation information (e.g., SS7 point code and SSN) associated with the matching entry is returned and incorporated in the message M1 (steps B15, B16 and B17). The message is then passed to HMRT routing process 270, which in turn directs the modified message to outbound LIM 230 for transmission to the destination HLR (step B18).

If no matching entry is located in the B-tree data structure, then a default routing address is returned (step B19). In this case, a new entry or node is created and inserted into the B-tree data structure using the IMSI identifier and default routing address 320. The outbound message is modified to include the new HLR address (step B17). The modified message is then passed to HMRT routing process 270, which in turn directs the message to outbound LIM 230 for transmission to the destination HLR (step B18).

Returning to step B13 of the flow chart in FIG. 5B, if the SCCP GTA parameter value and the MAP IMSI are not the same, this means that the signaling message has previously been routed to an HLR that did not include a subscriber record corresponding to the signaling message and that the HLR modified the SCCP global title address to include the entity address (e.g. E. 164 address) of the next HLR to be checked. In this case, the database record corresponding to the MAP IMSI must be located and updated to reflect the new HLR entity address. Accordingly, a search of MST database 260 is initiated using the MAP IMS (step B21). If a matching entry is located in the IMSI B-tree data structure, then the routing address translation information associated with the matching entry is updated to reflect entity address information stored in the SCCP GTA parameter of the message by the previous HLR node to which the message was routed (steps B22 and B23).

Once the MST database 260 has been updated with the new routing address translation information, the SCCP GTA information (i.e., HLR entity address) is used to perform a global title translation (GTT) or GTT-like routing address translation and consequently derive a valid SS7 point code/SSN network address (step B24). In the present example, such a translation operation may be performed using the entity address mapping data similar to that shown in Table 6. The modified message is then passed to HMRT routing process 270, which in turn directs the message to outbound LIM 230 for transmission to the destination HLR (step B18).

Returning to the decision point at step B22, if a matching entry is not located in the B-tree data structure, then a new entry is created in the data structure which associates the MAP IMSI identifier and the HLR entity address specified in the SCCP GTA parameter of the message (step B25). Again, once the MST database 260 has been updated with the new routing address translation information, the SCCP GTA information (i.e., the HLR entity address) is used to perform a global title translation (GTT) or GTT-like routing address translation and consequently derive a valid SS7 point code/SSN network address (step B24). The message is modified (step B17), and the modified message is then passed to HMRT routing process 270, which in turn directs the message to outbound LIM 230 for transmission to the destination HLR (step B18).

Thus, as illustrated above, an auto-provisioning routing node according to an embodiment of the present invention automatically updates its mobile services node network address translation tables based on received messages. In particular, the present invention automatically associates IMSIs with HLR addresses. This auto-provisioning avoids the need to manually provision IMSI translations and thereby decreases the labor associated with placing an auto-provisioning routing node in service. This auto-provisioning solution may be used in combination with conventional MSISDN-based auto-provisioning solutions to provide fully-automated database provisioning.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for automatically provisioning a mobile services node address translation database, the method comprising:
   (a) receiving a signaling message including first and second identifiers located in first and second portions of the signaling message;
   (b) determining whether the first identifier matches the second identifier; and
   (c) in response to determining that the first identifier does not match the second identifier, updating an entry corresponding to the second identifier in a mobile services node address translation database to include the first identifier as a mobile services node entity address.

2. The method of claim 1 wherein receiving signaling message including first and second identifiers located in first and second portions of the message includes receiving a MAP UpdateLocation message including an entity address of an HLR located in an SCCP portion of the MAP UpdateLocation message and an international mobile subscriber identifier located in a MAP portion of the MAP UpdateLocation message.

3. The method of claim 2 wherein receiving a MAP Update Location message includes receiving the MAP UpdateLocation message from an HLR that did not contain a record corresponding to the signaling message.

4. The method of claim 1 wherein receiving a signaling message including first and second identifiers located in first and second portions of the signaling message includes receiving a MAP UpdateLocation message including matching IMSIs in the MAP and SCCP portions of the signaling message, and wherein the method further comprises in response to determining the presence of matching IMSIs in the signaling message, performing a lookup in the mobile services node address translation database using one of the IMSIs.

5. The method of claim 4 comprising in response to failing to locate an entry corresponding to the IMSI in the mobile services node address translation database, inserting a record in the database corresponding to the IMSI and adding an entity address corresponding to a default mobile services node to the record.

6. The method of claim 4 comprising in response to locating a record in the mobile services node address translation database, extracting an entity address from the record and routing the UdateLocation message to the mobile services node corresponding to the entity address.

7. The method of claim 1 comprising routing the signaling message to a mobile services node corresponding to the first identifier.

8. The method of claim 7 wherein routing the signaling message to a mobile services node includes routing a signaling message to an HLR.

9. A method for automatically provisioning a mobile services node address translation database with records matching mobile subscriber identifiers to mobile services node network addresses, the method comprising:
   (a) receiving signaling messages at a routing node, each signaling message having an IMSI;
   (b) adding entries corresponding to the IMSIs to a mobile service node address translation database located in the routing node;
   (c) adding an entity address of a default mobile service node to each entry;
   (d) routing the signaling messages to the default mobile services node;
   (e) at the default mobile services node, for each signaling message, accessing a mobile subscriber database and determining whether a record corresponding to the IMSI exists;
   (f) in response to failing to locate a record corresponding to the IMSI, inserting an entity address in the message corresponding to a second mobile services node and routing the signaling message to the second mobile services node via the routing node; and
   (g) at the routing node, receiving the signaling message for which a record corresponding to the IMSI did not exist at the default mobile services node and updating an entry corresponding to the IMSI in the mobile services address translation database to include the entity address inserted by the default mobile services node.

10. The method of claim 9 wherein receiving signaling messages includes receiving a MAP UpdateLocation messages.

11. The method of claim 9 wherein routing signaling messages to the default mobile services node includes routing the signaling message to a default home location register.

12. The method of claim 9 wherein adding entries to the mobile services node address translation database includes adding entries to an IMSI b-tree in the mobile services node address translation database.

13. The method of claim 9 wherein routing the signaling message to a second mobile services node includes inserting the entity address for the second mobile services node in a global title address field of the signaling message.

14. The method of claim 13 comprising, at the routing node, global title translating the entity address into a network address for the second mobile services node.

15. The method of claim 9 comprising using the updated entry in the mobile services node address translation message to translate IMSIs in subsequently-received signaling messages.

16. An auto-provisioning routing node comprising:
   (a) a first communications module for sending and receiving signaling messages over external signaling links;
   (b) a mobile services node address translation database for storing mappings between mobile subscriber identifiers in the signaling messages and network addresses of destination mobile services nodes for the signaling messages; and
   (c) an auto-provisioning function operatively associated with the mobile services node address translation database for comparing first and second identifiers in the signaling messages, and, in response to determining that the first and second identifiers in the signaling messages do not match, updating records in the mobile services node address translation database to include the first identifiers as mobile services node network addresses corresponding to the second identifiers.

17. The auto-provisioning routing node of claim 16 wherein the communications module comprises an SS7 link interface module.

18. The auto-provisioning routing node of claim 16 wherein the communications module comprises a data communications module for communicating SS7 messages over an IP network.

19. The auto-provisioning routing node of claim 16 wherein the mobile services node network address translation database stores IMSI-to mobile-services-node address translations.

20. The auto-provisioning routing node of claim 19 wherein the IMSI-to mobile-services-node address translations comprise IMSI-to-HLR address translations.

21. The auto-provisioning routing node of claim 16 wherein the signaling messages include MAP UpdateLocation messages and wherein the auto-provisioning function is adapted to compare IMSI values stored in the MAP portion of the UpdateLocation messages with global title addresses stored in the SCCP portions of the signaling messages.

22. The auto-provisioning routing node of claim 21 wherein the auto-provisioning function is adapted to search the mobile services node network address translation database in response to determining that the MAP IMSI matches the global title address.

23. The auto-provisioning routing node of claim 22 wherein, in response to failing to locate an entry in the mobile services node address translation database, the auto-provisioning function is adapted to add a record to the mobile services node address translation database and insert a default mobile services node routing node address in the record.

24. The auto-provisioning routing node of claim 16 comprising a routing function operatively associated with the auto-provisioning function for routing messages to mobile services nodes corresponding to mobile services node network addresses extracted from the mobile services node address translation database.

25. A system for automatically provisioning a mobile services node address translation database, the system comprising:
  (a) a routing node including a mobile services address translation database and an auto-provisioning function for automatically provisioning translations from IMSIs to mobile services node addresses in the mobile services node address translation database based on signaling messages received by the routing node; and
  (b) n mobile services nodes operatively associated with the routing node, n being an integer of at least two, wherein the n mobile services nodes are adapted to successively route signaling messages to each other through the routing node in response to failing to locate subscriber records corresponding to the received signaling messages.

26. The system of claim 25 wherein the routing node comprises a signal transfer point.

27. The system of claim 25 wherein the routing node comprises an SS7/IP gateway.

28. The system of claim 25 wherein the mobile services nodes comprise home location registers.

29. The system of claim 25 wherein the auto-provisioning function is adapted to automatically provision IMSI-to-HLR translations in the mobile services node address translation database based on the signaling messages.

* * * * *